//  # 2,841,595

PROCESS FOR MANUFACTURE OF GLYCIDYL ETHERS OF POLYHYDRIC PHENOLS

Philip Pezzaglia, El Cerrito, Calif., assignor to Shell Development Company, New York, N. Y., a corporation of Delaware No Drawing. Application January 31, 1955
Serial No. 485,299

11 Claims. (Cl. 260—348.6)

This invention relates to an improved process for the production of glycidyl ethers of polyhydric phenols.

Glycidyl polyethers of polyhydric phenols, often termed epoxy resins, are valuable materials which are used in many applications such as surface coatings, adhesives, molding compositions, etc. The polyethers are generally prepared by reacting a polyhydric phenol with epichlorohydrin in alkaline medium. A particularly versatile group of epoxy resins are manufactured from epichlorohydrin and a dihydric phenol such as bis-phenol or 2,2-bis(4-hydroxyphenyl)-propane. The predominant constituent of these polyethers may be represented by the formula

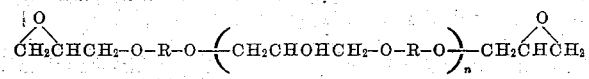

wherein $n$ is an integer of the series 0, 1, 2, 3, etc., and R represents the divalent radical to which the two phenolic hydroxyl groups are attached in the dihydric phenol. The average molecular weight of the polyether (average value of $n$) is controlled by the mole ratio epichlorohydrin to dihydric phenol employed in preparing the resin. Particular uses of epoxide resins require that they have particular values for $n$. Thus, for adhesive applications, it is desirable that average $n$ closely approach zero; in surface coating applications using amines as curing agents for the epoxide resin, it is preferred that $n$ be about 2; for preparation of air-drying esters wherein the resin is esterified with drying oil fatty acids, $n$ should be about 4, and in baked coating applications employing the epoxide resin in combination with a phenolic or urea resin, best results are obtained when $n$ is about 9. In order to meet the needs for different applications, the several resins of different molecular weights have been manufactured by using appropriate mole ratios of epichlorohydrin to bis-phenol. However, salt is a by-product of the reaction, and it has been the practice to remove salt by washing the crude resin with hot water while the resin is in molten condition. This washing operation becomes increasingly more difficult and time consuming as the molecular weight of the resins increases.

Such difficulties may be avoided by using a different method of manufacture to obtain epoxy resins of desired molecular weight. It is known that glycidyl polyethers of polyhydric phenols having lowest molecular weight (those wherein $n$ is equal or nearly equal to zero) are capable of forming resins of higher molecular weight by reaction with added polyhydric phenols. Thus, for example, by adding an appropriate quantity of bis-phenol to the glycidyl polyether of bis-phenol and heating the mixture at about 150–200° C. for a short time, epoxide resins of any desired molecular weight may be obtained. The reaction which occurs involves a simple coupling of epoxide groups with the phenolic hydroxyl groups present in the added polyhydric phenol. Since no salt or other by-products are formed, the washing difficulties with higher resins are completely overcome. However, in order to be commercially successful, it is apparent that this fusion method requires that production of the starting simple glycidyl polyether be efficient.

A process for production of glycidyl ethers of polyhydric phenols of lowest molecular weight is known. Werner and Farenhorst in U. S. Patent No. 2,467,171 patented the method for producing the simple ethers. Their method involves the addition of an equivalent amount of inorganic base to a solution of polyhydric phenol in excess epichlorohydrin maintained at 20–120° C. For example, the simple diglycidyl diether of bis-phenol is shown to be obtained by adding 2 moles of sodium hydroxide to a heated solution of a mole of bis-phenol in 4 moles of epichlorohydrin. Although this process using excess epichlorohydrin gives the simple ethers, I found that it was lacking in efficiency with respect to the yield of ether from epichlorohydrin.

A careful study of the reaction by me demonstrated that the yield of ether product from epichlorohydrin increased with use of less than the equivalent amount of base. It was also found that the ether product contained increasing amounts of chlorine as the quantity of base was decreased from the equivalent proportion. It was further discovered that the reactivity of the glycidyl ether product with added polyhydric phenol markedly decreased as the amount of chlorine in the ether product increased. This point is important because while the fusion method for manufacturing various higher epoxide resins requires obtaining high yield of starting ether, it is equally important that the reaction of the ether product with added polyhydric phenol should also proceed efficiently.

The sensitivity of the rate of reaction to chlorine content of the starting ether product is illustrated by data in the table below. The starting ethers were glycidyl diethers of bis-phenol containing the listed percentages of chlorine. Bis-phenol was added in amount of 0.6 equivalent per equivalent of epoxy in the ether. The mixtures were heated for 6 hours at 190 C., and the resulting products analyzed for unreacted phenolic hydroxyl groups in order to determine the extent of reaction.

| Percent Chlorine in Starting Ether | Extent of Reaction, percent |
|---|---|
| 0.3 | 100 |
| 1.2 | 90 |
| 1.9 | 88 |
| 2.7 | 84 |

It is seen from the foregoing that complete reaction was obtained only if the ether contained 0.3% or less of chlorine.

It is therefore an object of the present invention to provide an improved process for manufacturing simple glycidyl polyethers of polyhydric phenols of low chlorine content in high yield from epichlorohydrin. A further object is to provide a new method of better efficiency than known heretofore for manufacturing the ethers. Other objects will be apparent from the following description of the invention.

I have discovered that these and other objects may be accomplished by my process for the production of glycidyl ether of a polyhydric phenol which comprises etherifying the polyhydric phenol with epichlorohydrin in the presence of at least 2 molecules of epichlorohydrin per phenolic hydroxyl groups of the phenol by addition of only 90 to 98% of an equivalent of alkali metal hydroxide per equivalent of phenolic hydroxyl groups in the phenol, next separating unreacted excess epichlorohydrin from the reaction mixture, and then contacting the etherified polyhydric phenol with alkali metal hydroxide in excess amount over that needed to remove the chlorine from the ether.

I found that use of more than 98% of an equivalent of the hydroxide while the excess unreacted epichlorohydrin is present gives a rapid increase in epichlorohydrin polymer, glycidol and other undesired by-products from epichlorohydrin which results in loss of yield of polyether from the chlorohydrin. I further found that use of less than about 90% of an equivalent of the hydroxide gives an ether product containing such a large amount of unreacted phenolic groups that the subsequent treatment with alkali metal hydroxide in the absence of unreacted epichlorohydrin causes formation of undesired glycidyl polyether of high molecular weight in unduly large amount. For these reasons among others, the first step of the process employs the critical amount of from 90 to 98% of an equivalent of the hydroxide per equivalent of the phenolic hydroxyl groups in the starting phenol. In producing a glycidyl ether of a dihydric phenol according to the process, there is preferably used a reaction solution containing a mole of dihydric phenol in about 6 to 12 moles of epichlorohydrin (3 to 6 molecules of epichlorohydrin per phenolic hydroxyl group of the dihydric phenol) and to this solution are preferably added about 1.85 to 1.95 moles of sodium hydroxide.

The criticality of the amount of base added in the first step of the process will be evident from consideration of data given in the table below. A series of experiments were performed by adding the listed proportions of sodium hydroxide as a 40% by weight aqueous solution to a solution containing 1.00 mole of 2,2-bis(4-hydroxyphenyl)propane, termed bis-phenol for convenience, in 10 moles of epichlorohydrin. While adding the aqueous caustic, the epichlorohydrin solution was boiled, and the introduced and formed water was removed azeotropically with epichlorohydrin, the rates being such that the reaction mixture had a water concentration of 1–2%. In effecting the distillation, the distillate vapor was condensed, the distillate allowed to separate into two phases, and only the epichlorohydrin layer was returned as reflux. After completion of the addition, the unreacted epichlorohydrin was removed by distillation, and the formed salt was separated from the ether product. Also isolated was the epichlorohydrin polymer which is a peculiar cross-linked substance not soluble in water or organic solvents. The ether product was analyzed for weight percent chlorine, content of phenolic hydroxyl groups, etc. The results follow:

| Moles NaOH per Mole of Bis-Phenol | Epichlorohydrin Polymer, Equiv. per Mole of Bis-Phenol | Phenolic Hydroxyl, Equiv. per Mole of Ether | Percent Chlorine in Ether |
|---|---|---|---|
| 1.50 | 0.003 | 0.14 | 3.7 |
| 1.80 | 0.005 | 0.08 | 1.7 |
| 1.84 | 0.007 | 0.06 | 1.1 |
| 1.90 | 0.02 | 0.045 | 1.0 |
| 2.00 | 0.06 | 0.03 | 0.63 |
| 2.05 | 0.08 | 0.025 | 0.53 |
| 2.10 | 0.12 | 0.02 | 0.42 |

The foregoing results demonstrate that as the mole ratio of NaOH to bis-phenol increases, the loss of epichlorohydrin to polymer increases and that this increase is very rapid above the mole ratio of 1.96. Further, as the mole ratio decreases below about 1.80, the phenolic hydroxyl content increases rapidly. The process is therefore operated using 90 to 98% of the equivalent of alkali metal hydroxide per equivalent of phenolic hydroxyl.

The process of the invention is applicable for efficient production of glycidyl ethers of any suitable polyhydric phenols. Typical phenols include resorcinol, hydroquinone, methyl resorcinol, chlorohydroquinone, phloroglucinol 1,5-dihydroxynaphthalene, 4,4'-dihydroxydiphenyl, bis(4-hydroxyphenyl)methane, 1,1-bis(4-hydroxyphenyl)ethane, 1,1-bis(4-hydroxyphenyl)isobutane, 2,2-bis(4-hydroxyphenyl)propane which is termed bis-phenol hereinafter for convenience, 2,2-bis(4-hydroxyphenyl)butane, 2,2-bis(4-hydroxy-2-methylphenyl)propane, 2,2-bis(2-hydroxy-4-tertiary-butylphenyl)propane, 2,2-bis(2-hydroxyphenyl)propane, 2,4'-dihydroxydiphenyldimethylmethane, 2,2-bis(2-chloro-4-hydroxyphenyl)propane, 2,2-bis(2-hydroxynaphthyl)pentane, 2,2-bis(2,5-dibromo-4-hydroxyphenyl)butane, 4,4'-dihydroxybenzophenone, 1,3-bis(4-hydroxyphenyloxy)-2-hydroxypropane, 3-hydroxyphenyl salicylate, 4-salicoylamino-phenol, as well as more complex polyhydric phenols such as novolac resins obtainable by acid catalyzed condensation of phenol, p-cresol or other substituted phenols with aldehydes such as formaldehyde, acetaldehyde, crotonaldehyde, etc.; condensates of phenols with cardanol such as described in U. S. Patent 2,317,607; condensates of phenols with aliphatic diols such as described in U. S. Patent 2,321,620; and condensates of phenols with unsaturated fatty oils such as described in U. S. Patent 2,031,586. The polyhydric phenols contain 2 or more phenolic hydroxyl groups in the average molecule thereof and are free of other functional groups which would interfere with formation of the desired glycidyl ethers.

The epichlorohydrin employed in the process is not only a reactant, but it is also a solvent for the polyhydric phenol and the resulting ether of the phenol. The polyhydric phenol is first mixed with and dissolved in at least about 2 moles of epichlorohydrin per phenolic hydroxyl equivalent of polyhydric phenol. The phenolic hydroxyl equivalent of the polyhydric phenol is the unit weight of the phenol per phenolic hydroxyl group therein. Thus the phenolic hydroxyl equivalent of bis-phenol is 114 weight units since the compound contains two phenolic hydroxyl groups per molecule and has a molecular weight of 228. Similarly, a condensate of cardanol and phenol has a molecular weight of 438 and shows by analysis to contain 2.5 phenolic hydroxyl groups per average molecule so it has a phenolic hydroxyl equivalent weight of 176.

Besides functioning as a solvent, the excess epichlorohydrin contained in the reaction mixture suppresses the tendency of the forming glycidyl ether to form polymeric condensates with dihydric phenols as well as gelled or infusible products with phenols containing more than two hydroxyl groups by cross-linking. Usually the process is executed with use of about 3 to 12 moles of epichlorohydrin per phenolic hydroxyl equivalent of the polyhydric phenol. Larger quantities can be used if desired, such as up to 15 moles or higher, but they give no particular advantage and are generally not employed because it is essential that all of the unreacted epichlorohydrin be recovered as a matter of economy.

In the first step of the process, it is preferred to employ sodium hydroxide as the base although other alkali metal hydroxides such as lithium or potassium hydroxide may be employed if desired. It has been found most convenient to use the hydroxide or mixtures thereof in the form of an aqueous solution, preferably in more or less concentrated condition. The hydroxide may be added in solid form, or in suspension or solution in an inert organic solvent. Other epihalohydrins may be used in place of epichlorohydrin, such as the corresponding bromine compound.

The first step of the process may be effected at usual temperatures for etherifying the phenol such as from room temperature upwards. Owing to slowness of the reaction at lower temperature, it is preferred to effect the etherification at about 80 to 120° C. Since the reaction is effected in liquid phase, use of temperatures above the atmospheric boiling point of the reaction mixture requires use of superatmospheric pressure in order to maintain the reacting mixture liquid.

Whether or not the alkali metal hydroxide is anhydrous when added to the solution of polyhydric phenol in epichlorohydrin, it is desirable to effect the etherification while maintaining the water concentration at low values, preferably about 0.3 to 2% by weight. An excellent method for accomplishing this is to remove added and/or formed water by azeotropic distillation with epichlorohydrin. Even when the hydroxide is added as an aqueous solution of say 15 to 60% concentration, water and epichlorohydrin may be simultaneously distilled from the agitated reaction mixture. Regulation of the rates of addition of the aqueous hydroxide and of the removal of water enables the water concentration in the reaction mixture to be maintained within desired limits such as 0.3 to 2%. The distilling vapors of water and epichlorohydrin may be condensed whereupon the condensed distillate separates into two layers, and the epichlorohydrin rich lower layer which contains only a small amount of water is returned to the reaction mixture, preferably as reflux to the distilling column. Keeping the water content in the reaction mixture at low value inhibits loss of epichlorohydrin by hydration reactions.

Upon completion of the addition of hydroxide to the reaction mixture, the unreacted epichlorohydrin is separated therefrom and the ether product containing organically bound chlorine is then contacted with alkali metal hydroxide in excess amount over that needed to remove the chlorine from the ether. There are several ways in which these operations may be accomplished. The crude ether product contains by-product salt as well as the unreacted epichlorohydrin. If desired, the salt may be filtered from the crude product provided it is substantially anhydrous, and then the epichlorohydrin is separated as by distillation followed by contacting the chlorine-containing ether with the hydroxide. It is also possible first to distill the epichlorohydrin from the mixture of ether and salt, next contact the remaining mixture of ether and salt with the excess hydroxide, and then remove all of the salt as by filtration or water washing. In the preferred procedure, the epichlorohydrin is first removed from the mixture of ether and salt by distillation, the salt is next removed from the mixture by water washing using a substantially water-immiscible organic solvent for the ether, then the salt-free solution of chlorine-containing ether is contacted with the excess hydroxide, and finally the ether is isolated.

In the preferred procedure, the epichlorohydrin is removed by flash distilling off the bulk of the same at atmospheric pressure followed by vacuum distillation to separate the remainder such as to a temperature of 150 to 180° C. at a pressure of 1 to 20 mm. Hg. Methyl isobutyl ketone and water are then added to the resultant ether-salt mixture whereupon the salt separates as brine layer from the solution of ether in the ketone. The brine is discarded and the ether solution is contacted with the excess alkali metal hydroxide, preferably sodium hydroxide as a dilute aqueous solution. The contacting of the chlorine-containing ether with the hydroxide is usually effected at about 35 to 90° C. Residual hydroxide and the small amount of formed salt is removed from the ether solution by passage over an alumina bed or by treatment with a weak acidic substance such as acetic acid or dilute aqueous sodium dihydrogen phosphate. Finally, the desired glycidyl ether of the polyhydric alcohol is obtained by distilling off the ketone solvent first at atmospheric pressure and then at reduced pressure to remove any remainder.

In the preferred procedure, various liquid organic solvents are suitable for use in the salt removal operation. The solvent should be only partially miscible with water and shall be a solvent for the ether product as is the case, for example with methyl ethyl ketone, methyl propyl ketone, dipropyl ketone, methyl heptyl ketone, cyclohexanone, benzene, toluene, xylene as well as mixtures of two or more of the same. The organic solvent is used in amount of about 0.5 to 5 parts by weight per part of the ether. Sufficient water is added so that the resulting brine contains about 5 to 20% by weight of salt. The separation of the two phases is usually done at about 20 to 50° C. The salt-free solution of ether in solvent is then contacted with alkali metal hydroxide as about a 3 to 20% aqueous solution with good agitation whereby the chlorine content of the ether is reduced to about 0.3% or less. The hydroxide is used in excess amount such as about 3 to 15 equivalents per equivalent of chlorine in the resin. Most of the formed salt dissolves in the aqueous caustic phase. After the chlorine removal operation, the aqueous phase is separated from the organic phase containing the ether. In order to assure that no residual hydroxide remains in the organic phase when it is subjected to distillation for removal of the organic solvent, the crude organic phase is either run through a bed of granulated alumina, or is contacted and agitated with dilute aqueous acid such as 1 to 10% acetic acid or sodium dihydrogen phosphate. If necessary, the neutralized organic phase is next separated from the aqueous phase. The desired glycidyl ether of excellent quality is obtained by distilling therefrom the organic solvent, first by flash distillation at atmospheric pressure and then by vacuum distillation at about 150 to 180° C. under a pressure of about 1 to 20 mm. Hg.

The process may be effected either in batch or continuous fashion or partly batch and partly continuous. Thus, it is advantageous to conduct the initial etherification of the polyhydric phenol in batch, and effect the subsequent treatments and separations in continuous manner.

The following examples illustrate the invention, but the invention is not to be construed as limited to details described therein. The percentages are by weight.

*Example 1*

A reaction vessel fitted with a heater, stirrer, thermometer and distilling head having a separator providing return to the reactor of lower layer was charged with a solution containing a mole ratio of epichlorohydrin to bisphenol of 10:1. The solution was heated to about 100° C. and maintained at this temperature during addition of 1.90 moles of sodium hydroxide per mole of the bisphenol, the caustic being introduced as a 40% aqueous solution. Water and epichlorohydrin distilled from the reaction mixture, was condensed in the head, and the only epichlorohydrin layer returned to the reaction mixture. The rate of addition of caustic and rate of distilling kept the temperature at about 100° C. so the reaction mixture contained about 1.5% of water, the addition taking approximately 2 hours. Upon completing the caustic addition, the bulk of the unreacted epichlorohydrin was distilled from the reaction mixture followed by application of vacuum to a pressure of 1 mm. Hg and 160° C. to remove residual epichlorohydrin. The residue consisting of ether product and salt was cooled and to it was added an equal weight based on the ether of methyl isobutyl ketone along with three times this weight of water. The mixture was agitated at about 25° C. and then allowed to separate into two phases. The brine phase containing about 9.5% salt was removed and discarded. The organic phase with ether product containing about 1.0% chlorine was then contacted with an equal weight of 5% aqueous sodium hydroxide solution, and the mixture was agitated for an hour at about 80° C. This quantity of excess caustic amounted to about 8.9 times that needed to react with the organically bound chlorine in the ether product. The mixture was next cooled to about 50° C. and the aqueous phase separated. The organic phase was then agitated with about half an equal weight of 2% aqueous solution of sodium dihydrogen phosphate at about 25° C. to neutralize any residual sodium hydroxide. After separation of phases, the methyl isobutyl ketone was distilled from the organic phase, first up to a temperature of 160° C. under atmospheric pressure, and the down to a pressure of about 1 mm. Hg at the same temperature. The resulting diglycidyl ether of bis-phenol was a pale yellow liquid which analyzed as containing 0.25% chlorine and 0.521 epoxy equivalents per 100 grams, and had a molecular weight of 355. The product had high reactivity with added bis-phenol, giving 100% reaction when heated at 190° C. for 6 hours with an added 35.6% of bis-phenol.

I claim as my invention:

1. A process for the production of glycidyl ether of a polyhydric phenol which comprises etherifying the polyhydric phenol with epihalohydrin in the presence of from 2 to 15 moles of epihalohydrin per phenolic hydroxyl group of the phenol by addition of 90 to 98% of an equivalent of alkali metal hydroxide per equivalent of the phenolic hydroxyl groups of the phenol, next separating unreacted epihalohydrin from the reaction mixture, and then contacting the etherified polyhydric phenol with alkali metal hydroxide in excess amount over that needed to react with the halogen in the ether on a chemical equivalent basis.

2. A process for the production of glycidyl ether of a polyhydric phenol which comprises adding to a solution of the polyhydric phenol in from 2 to 15 moles of epichlorohydrin per phenolic hydroxyl equivalent of the phenol 90 to 98% of a mole of sodium hydroxide per phenolic hydroxyl equivalent of the phenol so as to etherify the phenol, next separating unreacted epichlorohydrin from the reaction mixture, and then contacting the etherified polyhydric phenol with sodium hydroxide in excess amount over that needed to react with the chlorine in the ether on a chemical equivalent basis.

3. A process for the production of glycidyl ether of a dihydric phenol which comprises etherifying the phenol with epichlorohydrin by adding about 1.85 to 1.95 moles of sodium hydroxide to a solution of a mole of the dihydric phenol in about 3 to 15 moles of epichlorohydrin, next separating unreacted epichlorohydrin from the reaction mixture, and then contacting the etherified phenol with excess sodium hydroxide over that needed to react on a chemical equivalent basis with chlorine contained in the ether, and then separating the formed salt and recovering the desired glycidyl ether of the phenol.

4. A process for the production of glycidyl ether of 2,2-bis(hydroxyphenyl)propane which comprises etherifying the phenol with epichlorohydrin by adding about 1.85 to 1.95 moles of sodium hydroxide to a solution of a mole of the dihydric phenol in about 3 to 15 moles of epichlorohydrin, next separating unreacted epichlorohydrin from the reaction mixture, and then contacting the etherified phenol with excess sodium hydroxide over that needed to react on a chemical equivalent basis with chlorine contained in the ether, and then separating the formed salt and recovering the desired glycidyl ether of the phenol.

5. A process for the production of glycidyl ether of a dihydric phenol which comprises adding 1.85 to 1.95 moles of sodium hydroxide as an aqueous solution containing about 15% by weight of the hydroxide up to the saturation concentration to an agitated solution of 1.00 mole of the phenol in about 6 to 12 moles of epichlorohydrin while distilling water along with epichlorohydrin from the reaction mixture with condensation of the distilled vapors as distillate which separates into two layers and return only of the epichlorohydrin rich lower layer to the reaction mixture so as to keep the water concentration in reaction mixture at about 0.3 to 2% by weight, next removing unreacted epichlorohydrin from the reaction mixture by distillation, then separating salt from the mixture of ether product and salt, and next agitating the ether with a dilute aqueous solution of sodium hydroxide in amount of about 3 to 15 equivalents of the hydroxide per equivalent of chlorine in the ether, and then separating the formed salt and recovering the desired glycidyl ether of the phenol.

6. A process for the production of glycidyl ether of 2,2-bis(4-hydroxyphenyl)propane which comprises adding 1.85 to 1.95 moles of sodium hydroxide as an aqueous solution containing about 15% by weight of the hydroxide up to the saturation concentration to an agitated solution of 1.00 mole of the phenol in about 6 to 12 moles of epichlorohydrin while distilling water along with epichlorohydrin from the reaction mixture with condensation of the distilled vapors as distillate which separates into two layers and return only of the epichlorohydrin rich lower layer to the reaction mixture so as to keep the water concentration in reaction mixture at about 0.3 to 2% by weight, next removing unreacted epichlorohydrin from the reaction mixture by distillation, then separating salt from the mixture of ether product and salt, and next agitating the ether from a dilute aqueous solution of sodium hydroxide in amount of about 3 to 15 equivalents of the hydroxide per equivalent of chlorine in the ether, and then separating the formed salt and recovering the desired glycidyl ether of the phenol.

7. A process for the production of glycidyl ether of a dihydric phenol which comprises the steps of adding about 1.85 to 1.95 moles of sodium hydroxide as an aqueous solution containing about 15% by weight of the hydroxide up to the saturation concentration to an agitated solution of 1.00 mole of the phenol in about 6 to 12 moles of epichlorohydrin while distilling water and epichlorohydrin from the reaction mixture at such a rate that the reaction mixture contains about 0.3 to 2% by weight of water, the distilled vapors being condensed and separated with only the epichlorohydrin layer being returned to the reaction mixture, next distilling the unreacted epichlorohydrin from the reaction product, then agitating the mixture of ether product and salt with about an added 50% to 500% based on the ether product of a substantially water-immiscible organic solvent for the ether selected from the group consisting of methyl ethyl ketone, methyl propyl ketone, dipropyl ketone, methyl heptyl ketone, cyclohexanone, benzene, toluene and xylene and mixtures of any of the foregoing members and sufficient water to form a brine containing about 5 to 20% by weight of salt followed by separating the brine layer from the organic layer, next agitating the organic layer with a dilute aqueous solution of sodium hydroxide in amount of about 3 to 15 equivalents of the hydroxide per equivalent of chlorine in the ether followed by separation of the aqueous layer from the organic layer, and then distilling the organic solvent from the ether.

8. The process as defined by claim 7 wherein the dihydric phenol is 2,2-bis(4-hydroxyphenyl)propane.

9. The process as defined by claim 7 wherein the dihydric phenol is resorcinol.

10. The process as defined by claim 7 wherein the dihydric phenol is diphenylolmethane.

11. The process as defined in claim 7 wherein the dihydric phenol is 2,2-bis(4-hydroxyphenyl)propane.

References Cited in the file of this patent

UNITED STATES PATENTS

| | | |
|---|---|---|
| 2,134,537 | Stein | Oct. 25, 1938 |
| 2,467,171 | Werner et al. | Apr. 12, 1949 |
| 2,512,996 | Bixler | June 27, 1950 |
| 2,615,008 | Greenlee | Oct. 21, 1952 |
| 2,640,037 | Parry | May 26, 1953 |
| 2,682,515 | Naps | June 26, 1954 |
| 2,682,547 | Clemens et al. | June 29, 1954 |
| 2,698,315 | Greenlee | Dec. 28, 1954 |
| 2,712,000 | Zech | June 28, 1955 |
| 2,716,099 | Bradley | Aug. 23, 1955 |
| 2,717,885 | Greenlee | Sept. 13, 1955 |
| 2,735,829 | Wiles | Feb. 21, 1956 |
| 2,752,269 | Condo | June 26, 1956 |